(12) United States Patent
Luo et al.

(10) Patent No.: US 8,210,046 B2
(45) Date of Patent: Jul. 3, 2012

(54) COMPOSITION FOR ACOUSTIC DAMPING

(75) Inventors: Wei Luo, Boalsburg, PA (US); Paul Aloysius Meyer, McVeytown, PA (US)

(73) Assignee: GE Inspection Technologies, LP, Lewistown, PA (US)

( * ) Notice: Subject to any disclaimer, the term of this patent is extended or adjusted under 35 U.S.C. 154(b) by 1000 days.

(21) Appl. No.: 12/187,799

(22) Filed: Aug. 7, 2008

(65) Prior Publication Data
US 2009/0049918 A1 Feb. 26, 2009

Related U.S. Application Data

(60) Provisional application No. 60/956,415, filed on Aug. 17, 2007.

(51) Int. Cl.
*G01N 29/28* (2006.01)
(52) U.S. Cl. ............... 73/644; 310/326; 310/336
(58) Field of Classification Search ............ 73/627, 73/644; 181/207, 208; 310/326, 327, 328, 310/336
See application file for complete search history.

(56) References Cited

U.S. PATENT DOCUMENTS 2,912,854 A * 11/1959 Schubring ............ 73/644
4,577,505 A * 3/1986 Jestrich et al. ............ 73/629
5,477,858 A * 12/1995 Norris et al. ............ 600/441
6,111,339 A * 8/2000 Ohya et al. ............ 310/358

FOREIGN PATENT DOCUMENTS
WO    WO 96/04490 A    2/1996

OTHER PUBLICATIONS

Database WPI Week 198514 Thomson Scientific, London, GB: AN 1985-084697 XP002511153.
Database WPI Week 200772 Thomson Scientific, London, GB: AN 2007-766100 XP00251154.

* cited by examiner

*Primary Examiner* — Hezron E Williams
*Assistant Examiner* — Rose M Miller
(74) *Attorney, Agent, or Firm* — GE Global Patent Operation; Mark A. Conklin

(57) ABSTRACT

In one embodiment of the invention, a composition for a damping wedge in an ultrasonic probe having a wedge body is disclosed, the composition including: a viscoelastic material having a ratio of the imaginary part to the real part of the modulus of elasticity of at least about 5% and an acoustic impedance less than that of the wedge body; a filament-shaped filler in an effective amount to provide good dispersability in the viscoelastic material and to substantially match the acoustic impedance of the damping wedge to the wedge body; and a viscosity enhancer in an effective amount to increase the viscosity of the composition to maintain a homogenous distribution of the filament-shaped filler by preventing the filament-shaped filler from settling.

21 Claims, 13 Drawing Sheets

COMPOSITION FOR ACOUSTIC DAMPING

CROSS-REFERENCE TO RELATED APPLICATIONS

This application claims priority from U.S. Provisional Patent Application No. 60/956,415, filed on Aug. 17, 2007.

BACKGROUND OF THE INVENTION

This invention relates generally to compositions used for acoustic damping, such as but not limited to those used in damping wedges for ultrasonic probes.

Ultrasonic probes having phased array transducers inject acoustic waves into an object under test at an oblique angle to inspect the test object for flaws of defects. When the oblique angle is larger than the first critical angle, according to Snell's Law, the longitudinal waves will disappear, and only the newly converted shear waves will propagate in the object under test. The simplicity of one pure wave mode benefits the ultrasonic inspection greatly. The acoustic waves used in the object under test are preferably shear waves. A wedge with an angle larger than the first critical angle is usually attached to the transducer to generate shear waves in objects under test. However, a portion of the longitudinal waves generated by the transducers are reflected from the wedge body-test object interface. If the multiple reflections of these longitudinal waves in the wedge are not eliminated before being received by the array transducers, the longitudinal wave echoes produce noise in the image generated from the received ultrasonic shear wave echoes.

Shear wave ultrasonic probes typically have a wedge body connected to the ultrasonic transducers on an angled surface relative to the wedge body surface that will contact an object under test, and a damping wedge fit over the front side of the wedge body opposite the transducers. The damping wedge is provided for the purpose of reducing the longitudinal wave reflections or echoes as much as possible from the received ultrasonic signal. The damping wedge must both attenuate ultrasonic signals, measured in dB attenuation per inch (dB/in.), and match the impedance of the wedge body, measured in MRayl, while being sufficiently rigid to be machined and to maintain its shape, which can exclude many substances from consideration for use making damping wedges.

The attenuation and/or impedance matching of the damping wedge are often not optimal. FIGS. 1 and 2 illustrate the problems associated with the prior art. FIG. 1 shows the situation when the attenuation by the damping wedge 10 is not sufficient. In this case, the ultrasonic probe 50 has transducers 30 which produce longitudinal (L) waves. A portion of the longitudinal waves (L) are converted to shear waves (S) when they are incident into the interface between the wedge body 20 and the object under test 40. The converted shear waves (S) pass through the object under test 40. Meanwhile, longitudinal waves (L) reflect from the wedge body-test object interface 35, into the prior art damping wedge 10 and then the echoes return through the wedge body-damping wedge interface 15 and wedge body 20 are still strong enough to be received by the transducers 30. When impedance matching between the prior art damping wedge 10 and the wedge body 20 is poor, the longitudinal wave (L) reflects and echoes strongly from the wedge body-damping wedge interface 15 with the prior art damping wedge 10, as illustrated by FIG. 2.

Each of these problems results in unwanted longitudinal wave echoes being received by the transducer and generating a noise signal. As the ultrasonic frequency becomes lower, the noise increases due to the fact that the attenuation from the damping has a direct relationship with frequency. Operating frequencies below 4 MHz are desirable to use for inspecting certain objects with ultrasonic, but noise from non-attenuated longitudinal waves interferes with the inspection when using known damping wedge material compositions. For example, lower frequencies, around 1.5 MHz to 2 MHz, provide greater penetration depth than frequencies above 2 MHz, which is required in certain applications. But, known damping wedge material compositions are insufficient to attenuate the noise signal from longitudinal waves.

Ultrasonic probe designers can use three mechanisms to reduce noise from longitudinal waves—scattering, absorption, and ultrasonic geometric divergence. Scattering is done by adding fillers to damping wedge materials compositions for reflecting the longitudinal waves non-coherently. Absorption reduces wave strength by converting wave energy to heat, and is related to the viscoelasticity of the material used. Geometric divergence utilizes v-grooves formed in the wedge body-damping wedge interface.

Available damping wedges do not provide sufficient damping of longitudinal waves at lower frequencies, such as around 2 MHz. FIGS. 3 and 4 illustrate the frequency spectrum response and attenuation provided by a prior art damping wedge composed of Epoxy 303 available from Mereco Technologies Group, Inc. for a 24 inch and 48 inch blocks, referred to herein as "thin" and "thick" blocks, immersed in water. The thick block, for example, has a frequency response range of about −40 dB between 4 MHz to 2 MHz operating frequency. Both the thick and thin blocks exhibit a total attenuation of about −80 dB/in. at 4 MHz, only −40 dB/in. at 2 MHz and slightly more than −20 dB/in. at 1 MHz. As seen in FIG. 4, the attenuation function is substantially linear with a slope of about −17.0 (dB/in.)/MHz.

Application size constraints also limit the dimensions of the damping wedge, and thereby the amount of damping material available to attenuate unwanted acoustic waves. For example, some applications limit the size of the damping wedge to less than one half inch thick. Thus, simply adding material to a damping wedge is not an option for making the damping more effective. Damping wedge material compositions must also be sufficiently rigid that they can be machined using saws, grinders and other tools.

Accordingly, a need exists for an improved ultrasonic damping wedge material composition for making damping wedges which are effective at relatively low ultrasonic frequencies. Further, a method for designing effective ultrasonic damping wedges is needed to optimize impedance matching and attenuation of unwanted acoustic waves. The damping wedge material composition must be rigid enough that it can be machined to useful shapes.

BRIEF DESCRIPTION OF THE INVENTION

In one embodiment of the invention, a composition for a damping wedge in an ultrasonic probe having a wedge body is disclosed, the composition comprising: a viscoelastic material having a ratio of the imaginary part to the real part of the modulus of elasticity of at least about 5% and an acoustic impedance less than that of the wedge body; a filament-shaped filler in an effective amount to provide good dispersability in the viscoelastic material and to substantially match the acoustic impedance of the damping wedge to the wedge body; and a viscosity enhancer in an effective amount to increase the viscosity of the composition to maintain a homogenous distribution of the filament-shaped filler by preventing the filament-shaped filler from settling.

DETAILED DESCRIPTION OF THE INVENTION

Figure 1:
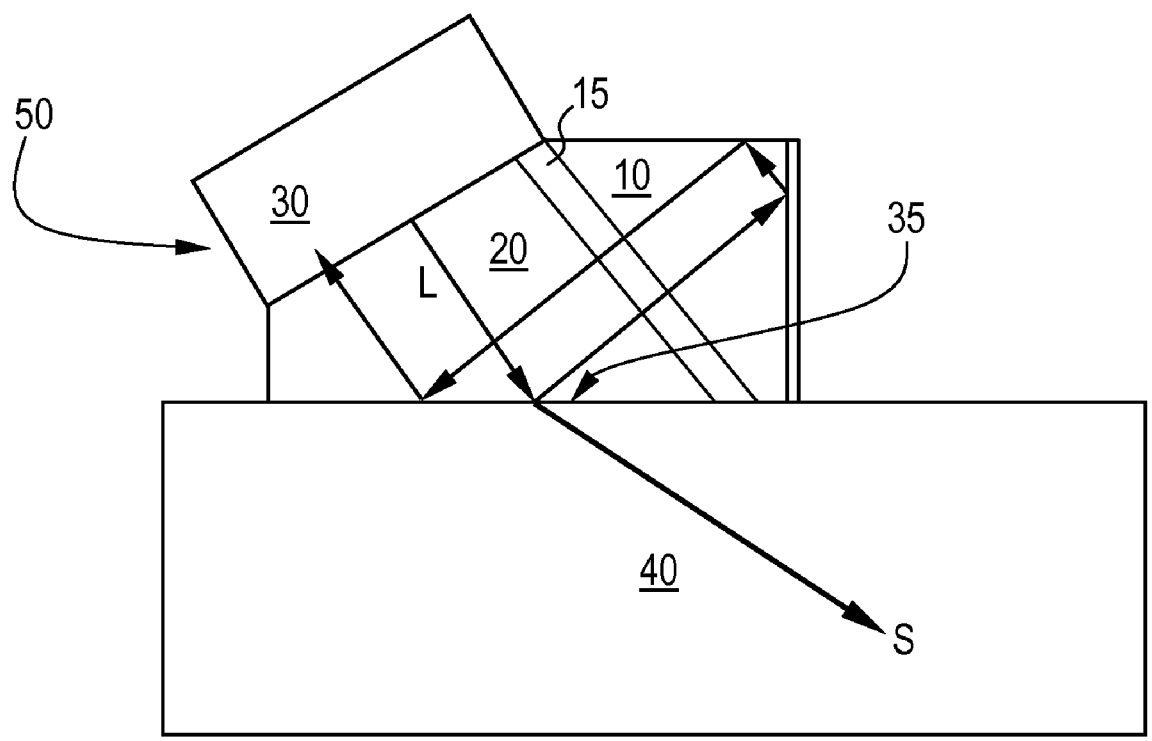
FIG. 1 is a right side elevation view, of a prior art ultrasonic probe.
Figure 2:
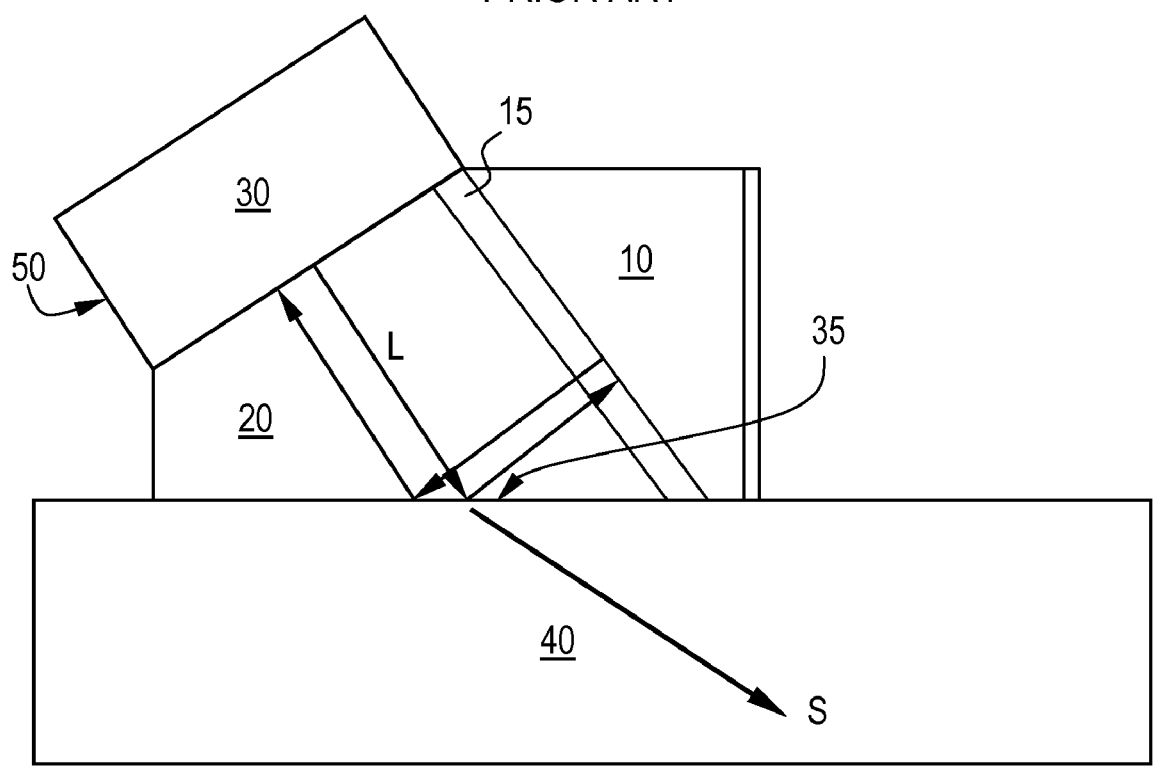
FIG. 2 is another right side elevation view of a prior art ultrasonic probe.
Figure 3:
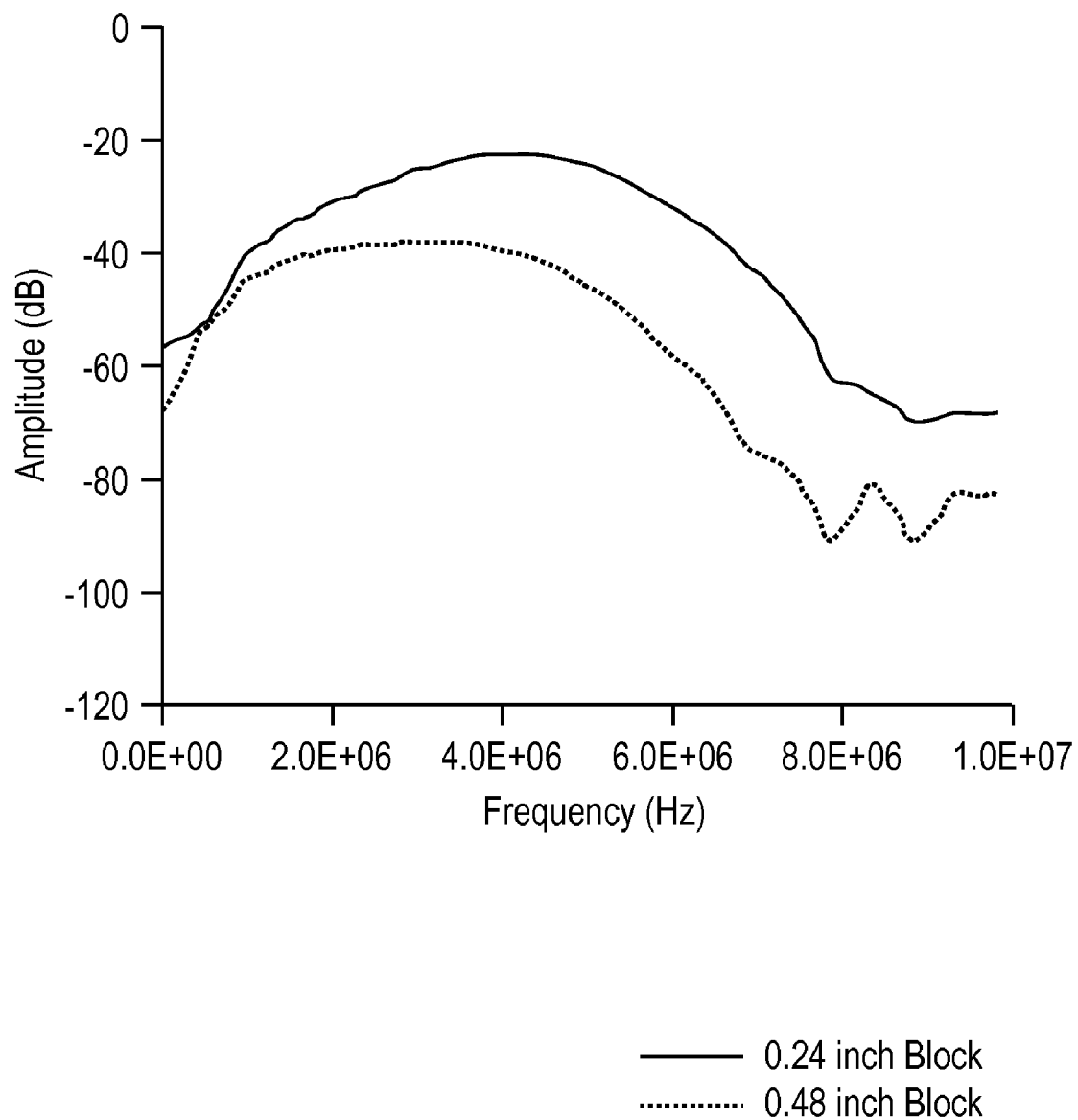
FIG. 3 is a graph showing frequency spectrum response for an acoustic signal transmitted through two different thicknesses of a prior art damping wedge as a function of frequency versus amplitude.
Figure 4:
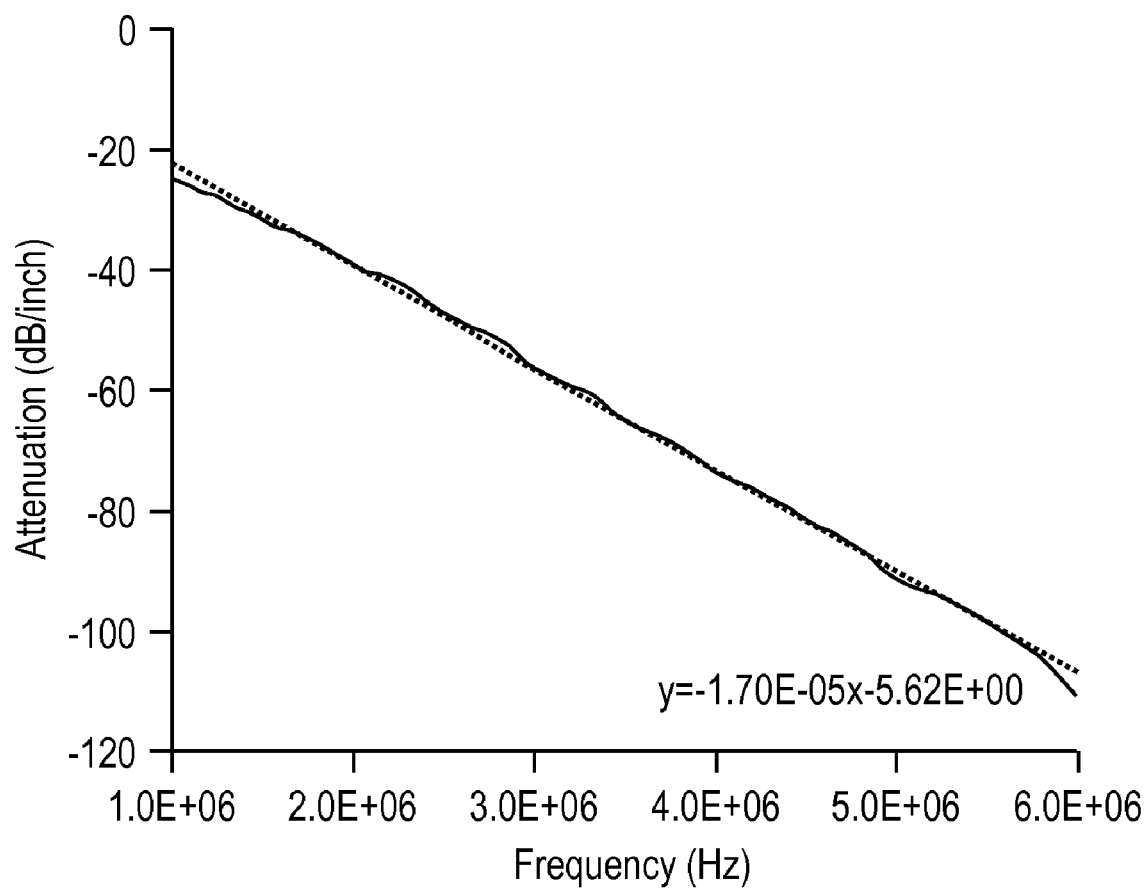
FIG. 4 is a graph showing acoustic signal attenuation in dB per inch as a function of operating frequency in Hertz for the prior art damping wedge of FIG. 3.
Figure 5:
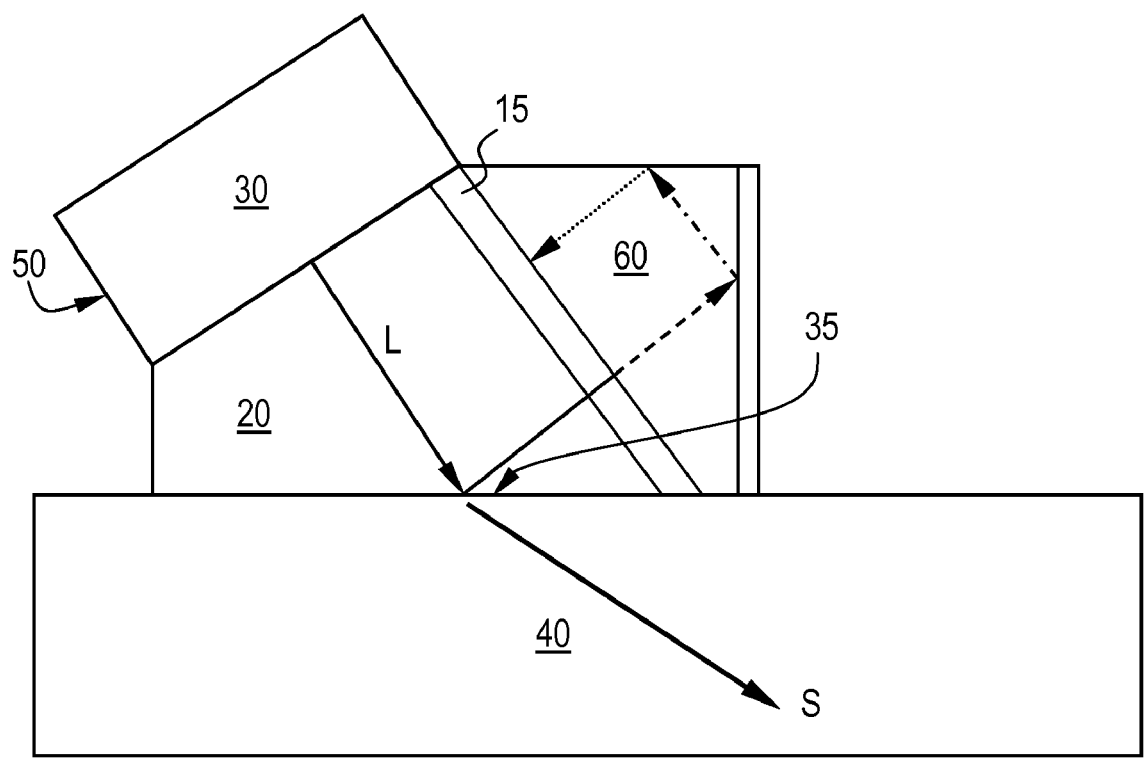
FIG. 5 is a right side elevation view of an ultrasonic probe in one embodiment of the invention.

Referring now to the drawings in which like reference numerals are used to indicate the same or related elements, FIG. 5 illustrates an ultrasonic angle-beam type probe 50 having ultrasonic transducers 30 mounted on a wedge body or protective block 20 at an angle to the surface of an object under test 40. Transducers 30 are mounted at an angle greater than the first critical angle according to Snell's Law to ensure generated longitudinal waves (L) will be converted to shear waves (S) at the wedge body-test object interface 35. Damping wedge 60 is connected to the wedge body 20 at interface 15. The construction and arrangement of the ultrasonic probe 50, wedge body 20, and damping wedge 60 for an ultrasonic wedge, as described herein and shown in the appended figures, is illustrative only.

As shown in the drawing of FIG. 5, shear waves represented by arrow S are converted from incident longitudinal waves (L) at the wedge body-test object interface 35, and propagate through object under test 40. Longitudinal waves represented by arrow L are reflected off the surface of object under test 40, pass through wedge body-damping wedge interface 15 and begin attenuating within the damping wedge 60. The attenuation characteristics of damping wedge 60 are such that the longitudinal waves L are completely damped or attenuated before reaching wedge body-damping wedge interface 15 again from the damping wedge 60 side. Since the longitudinal waves L are completely attenuated, there is no noise component in the ultrasonic echoes received by transducers 30, and so an image free of noise from unwanted ultrasonic longitudinal wave echoes can be obtained.

The damping wedge 60 produces the beneficial effect of eliminating longitudinal wave L reflections because the damping wedge 60 is acoustic impedance-matched to the material of the wedge body 20, while also providing high acoustic signal attenuation using absorption mechanism to dissipate the wave energy into heat. In one embodiment of the damping wedge 60, a viscoelastic material, such as but not limited to an epoxy, having a ratio of the imaginary part to the real part of the modulus of elasticity of at least about 5% and an acoustic impedance less than the impedance of the wedge body 20 is present in an amount of 100 parts by weight. The damping wedge 60 exhibits attenuation coefficient of significantly greater than −17.0 (dB/in.)/MHz (e.g., in the range between about −65 (dB/in.)/MHz to about −85 (dB/in.)/MHz). The following discussion will explain the relationship of the modulus of elasticity components to the selection further.

As will be understood, for a viscoelastic material, the elastic modulus can be expressed as a complex number:

$$E^* = E' + iE'' \tag{1}$$

wherein, E' is the storage modulus and E'' is the loss modulus.

For a pure elastic material, the imaginary part of equation (1) is zero, and so there is no loss or attenuation. The loss modulus of a viscoelastic material is never zero. Thus, the larger E'', the greater the absorption or attenuation. Typically, more viscous or softer materials provide greater viscoelasticity and therefore, higher attenuation.

Wave propagation in a viscoelastic material is a multi-dimensional problem, but it can be viewed as a one-dimensional problem for simplicity:

$$\frac{d^2 u}{dx^2} = \frac{1}{c^*(i\omega)^2} \frac{d^2 u}{dt^2} \tag{2}$$

The displacement, u, can be expressed as a function of time along the x-axis dimension:

$$u(x, t) = \tag{3}$$
$$A e^{i(\omega t - k^* x)} = A e^{i(\omega t - (k' + ik'')x)} = A e^{k'' x} e^{i(k' x - \omega t)} = A e^{-\alpha(\omega) x} e^{i\left(\frac{\omega}{c(\omega)} x - \omega t\right)}$$

wherein k* is the complex wave number resulting from the viscoelastic nature of the damping material and α(ω) is the attenuation coefficient, which is the imaginary part of the complex wave number k*:

$$\text{real component} = \text{velocity} = k' = \left[\frac{\omega}{c(\omega)}\right] = \text{Re}\left[\frac{\omega}{c^*(\omega)}\right] \quad (4)$$

$$\text{imaginary component} = \text{attenuation} = k'' = -\alpha(\omega) = \text{Im}\left[\frac{\omega}{c^*(\omega)}\right] \quad (5)$$

so that the attenuation in dB is given by:

$$\text{Attenuation(dB)} = 20\log_{10}(e^{-\alpha(\omega)x}) = -\alpha(\omega)x$$
$$20\log_{10}(e) = -8.69\alpha(\omega)x \quad (6)$$

And, correspondingly, the attenuation can be expressed as a function of complex material properties inherent to viscoelasticity. The attenuation coefficient $\alpha(\omega)$ is the attenuation coefficient can be expressed:

$$\alpha(\omega) = \text{Im}\left[-\frac{\omega}{c^*(\omega)}\right] \quad (7)$$

where the complex longitudinal wave velocity is:

$$c_1^* = \sqrt{\frac{E^*(1-v^*)}{\rho(1+v^*)(1-2v^*)}} \quad (8)$$

where $v$ is Poisson's ratio, and the complex shear wave velocity is given by:

$$c_2^* = \sqrt{\frac{G^*}{\rho}} \quad (9)$$

Accordingly, the complex property of viscoelastic materials can be expressed by material velocity and attenuation. Velocity is expressed as:

$$c^*(\omega) = \frac{1}{\frac{1}{c(\omega)} - i\frac{\alpha(\omega)}{\omega}} \quad (10)$$

Young's modulus is expressed as:

$$E^* = \left[\frac{3 - 4\left(\frac{c_2^*}{c_1^*}\right)^2}{1 - \left(\frac{c_2^*}{c_1^*}\right)^2}\right] \quad (11)$$

$$G^* = \left[\frac{3 - 4\left(\frac{c_2^*}{c_1^*}\right)^2}{1 - \left(\frac{c_2^*}{c_1^*}\right)^2}\right] \cdot c_2^{*2} \cdot$$

$$\rho = \left[\frac{3 - 4\left(\frac{c_2\omega - ic_1c_2\alpha_1}{c_1\omega - ic_1c_2\alpha_2}\right)^2}{1 - \left(\frac{c_2\omega - ic_1c_2\alpha_1}{c_1\omega - ic_1c_2\alpha_2}\right)^2}\right] \cdot \left(\frac{c_2\omega}{\omega - ic_2\alpha_2}\right)^2 \cdot \rho$$

and shear modulus is given by:

$$G^* = \mu^* = c_2^{*2} \cdot \rho = \left[\frac{1}{c_2(\omega)} - i\frac{\alpha_2(\omega)}{\omega}\right]^{-2} \cdot \rho = \left(\frac{c_2\omega}{\omega - ic_2\alpha_2}\right)^2 \cdot \rho \quad (12)$$

where $c_1$ is the longitudinal wave velocity and $c_2$ is shear wave velocity.

Next, the Rayleigh damping model is considered to generate a damping loss factor that can be used to estimate the material viscoelasticity and attenuation. The governing equation for a dynamic system is:

$$[M]\{\ddot{D}\} + [C]\{\dot{D}\} + [K]\{D\} = \{R^{ext}\} \quad (13)$$

and Rayleigh damping is expressed as:

$$[C] = \alpha[M] + \beta[K] \quad (14)$$

where the fraction of critical damping is:

$$\xi = \frac{\alpha_R}{2\omega} + \frac{\beta_R\omega}{2} \quad (15)$$

and wherein $\alpha_R$ is the mass proportional factor, which damps the lower frequencies and is caused by the model movement through a viscous fluid, and so it is therefore related with the absolute model velocity, while $\beta_R$ is the stiffness proportional damping factor, which damps the higher frequencies and is related to the material viscous property and is proportional to the strain rate. This leads to the expression of the damping loss factor as:

$$\eta = \frac{E''}{E'} = 2\xi = 2\left(\frac{\alpha_R}{2\omega} + \frac{\beta_R\omega}{2}\right) \approx \beta_R\omega \quad (16)$$

wherein it can be seen that the ratio of the imaginary portion of the modulus of elasticity relative to the real portion of the modulus of elasticity is directly proportional to the stiffness proportional damping factor for a given frequency $\omega$.

According to the embodiments of the invention, a viscoelastic material having a ratio of the imaginary to real parts of the modulus of elasticity of at least about 5% and impedance less than the wedge body 20 is combined with a filler having a filament shape greatly improve acoustic damping performance. Nonlimiting examples of such viscoelastic materials include epoxies (e.g., Epoxy 303 available from Mereco Technologies Group, Inc. or STYCAST 1265 A/B epoxy available from Emerson & Cuming). Nonlimiting examples of filament-shaped fillers include inorganic whiskers and fiber ceramics. Nonlimiting examples of inorganic whiskers and fiber ceramics include fiberglass (e.g., 731EC Milled available from Owens Corning Co.) and alumina fiber (e.g., NEXTEL 610 available from 3M Co.). The filament-shaped filler is provided in an effective amount to provide good dispersability in the viscoelastic material and so that the acoustic impedance of the mixture substantially matches the acoustic impedance of the wedge body 20. An impedance matching which results in less than about 6% total reflection of longitudinal waves is acceptable. A viscosity enhancer is added in an amount as needed to increase the viscosity of the mixture and, thereby, maintain a homogenous distribution of the filament-shaped fillers by preventing the filler from settling. The viscosity enhancer can be an inorganic filler with a particle size less than 1 micron. Nonlimiting examples of viscosity enhancers include an amorphous silica (e.g., CAB-O-SIL untreated fumed silica available from Cabot Corp.).

The following Table 1 illustrates compositions having the characteristics for a damping wedge 60 in several embodiments of the invention:

TABLE 1

Damping Wedge Material Compositions

| Formula # | Viscoelastic Material Modulus Ratio | Weight | Filament-Shaped Filler Material | Weight | Viscosity Enhancer Material | Weight |
|---|---|---|---|---|---|---|
| 1 | 7% | 100 | Fiberglass | 10 | Fumed silica | 1 |
| 2 | 7% | 100 | Fiberglass | 20 | Fumed silica | 1 |
| 3 | 7% | 100 | Fiberglass | 30 | Fumed silica | 1 |
| 4 | 7% | 100 | Fiberglass | 40 | Fumed silica | 1 |
| 5 | 17% | 100 | Fiberglass | 5 | Fumed silica | 3 |
| 6 | 17% | 100 | Fiberglass | 15 | Fumed silica | 3 |
| 7 | 17% | 100 | Fiberglass | 25 | Fumed silica | 3 |
| 8 | 17% | 100 | Fiberglass | 35 | Fumed silica | 3 |
| 9 | 17% | 100 | Alumina fiber | 10 | Fumed silica | 4 |
| 10 | 17% | 100 | Alumina fiber | 15 | Fumed silica | 4 |
| 11 | 17% | 100 | Alumina fiber | 20 | Fumed silica | 4 |
| 12 | 17% | 100 | Alumina fiber | 25 | Fumed silica | 4 |

In Table 1, the Modulus Ratio column refers to the ratio of the imaginary component relative to the real component of the elastic modulus for the viscoelastic material, and the Weight columns indicate parts by weight each part is present in the formula. Formulas 1-12 were found to exhibit very good damping properties. In all cases, the optimal amount of filament-shaped filler added will depend in part on the acoustic impedance of the wedge body 20 that the damping wedge 60 will be used with, since the filler is added to raise the acoustic impedance of the damping wedge 60 material composition to match that of the wedge body 20 as closely as possible.

It will be appreciated that different wedge body 20 materials will have different acoustic impedances. However, it is anticipated that most wedge body 20 materials will have an acoustic impedance of between about 1.5-3.5 MRayl. Accordingly, the viscoelastic materials with the ratio of components of the elastic modulus being at least about 5% should also have an acoustic impedance in the same range and lower, so that the acoustic impedance of the damping wedge 60 material composition can be raised to match the acoustic impedance of the wedge body 20 by the addition of the filament-shaped filler.

Exemplary damping wedge 60 material compositions are further illustrated in the following examples.

Example 1

Figure 6:
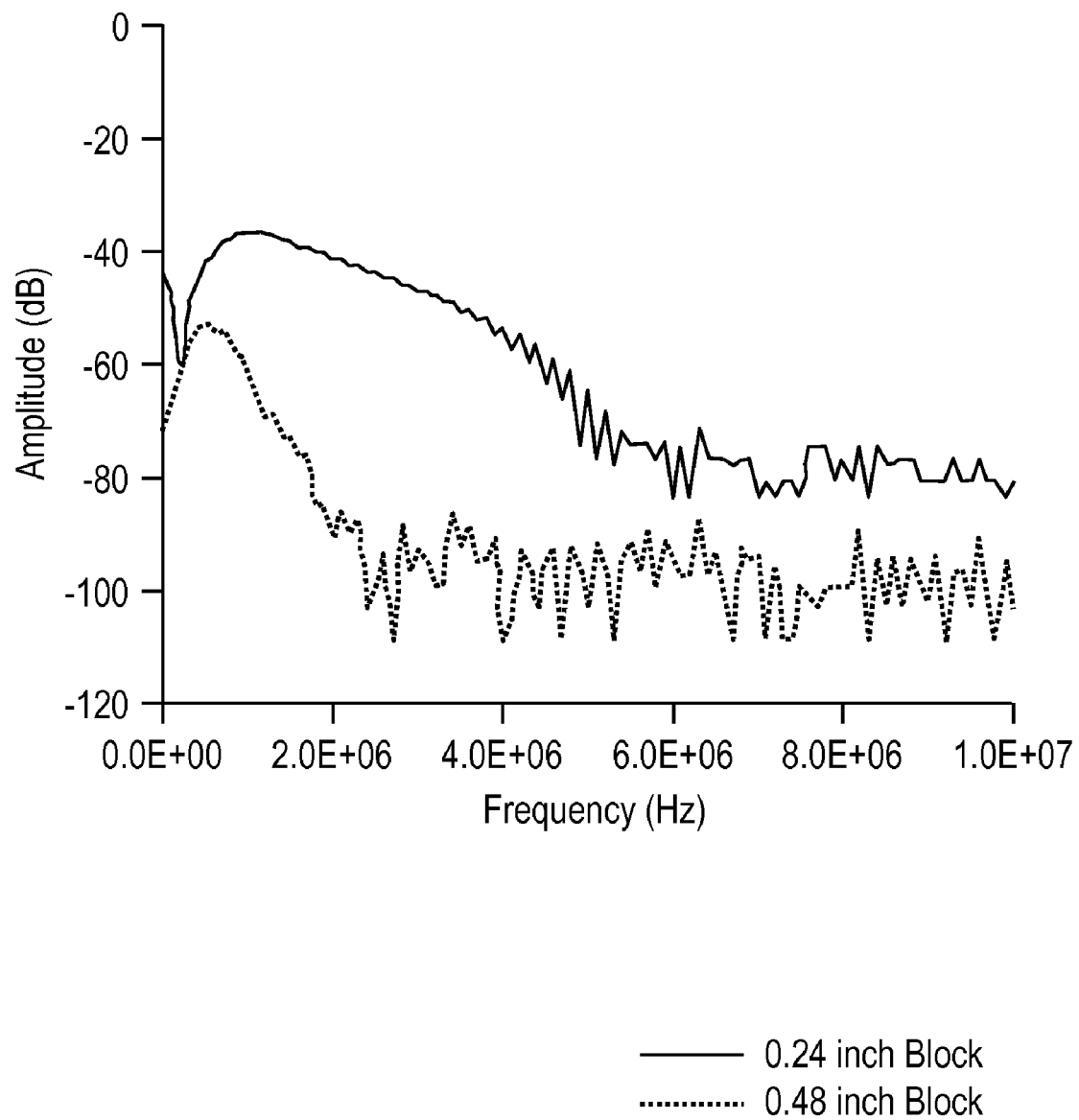
FIG. 6 is a graph showing frequency spectrum response for an acoustic signal transmitted through two different thicknesses of a damping wedge in one embodiment (Example 1) of the invention as a function of frequency versus amplitude.
Figure 7:
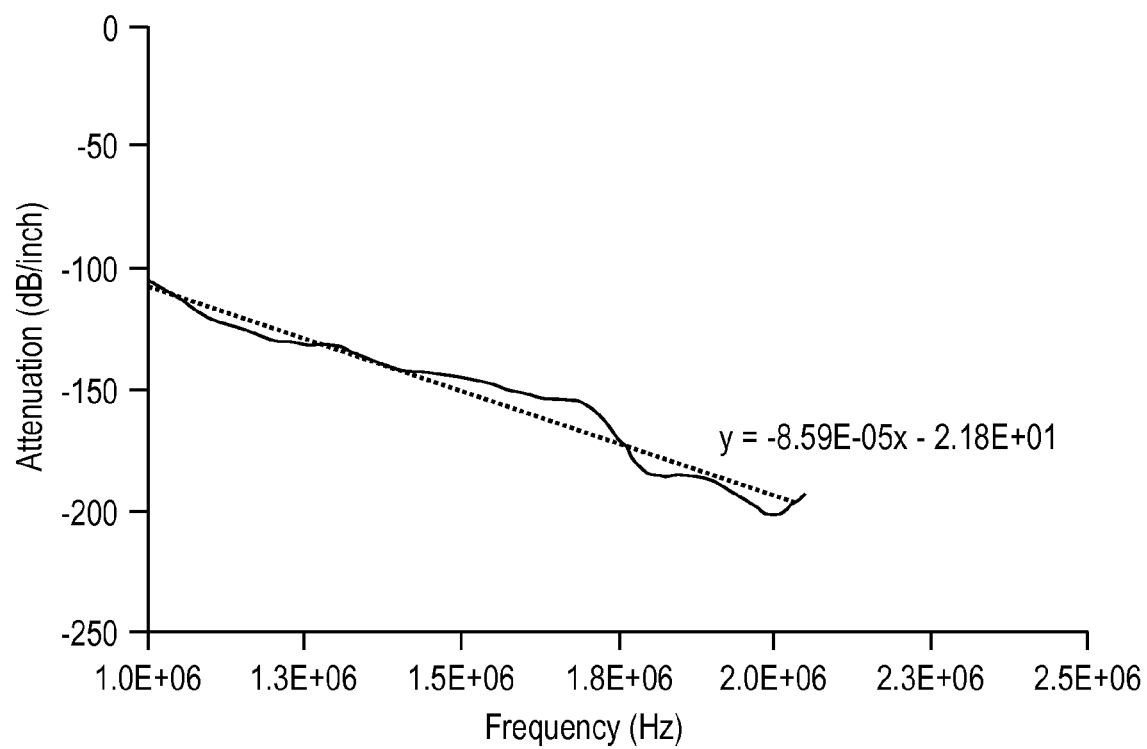
FIG. 7 is a graph showing acoustic signal attenuation in dB per inch as a function of operating frequency in Hertz for the damping wedge of FIG. 6.

The damping wedge 60 material composition was made by combining epoxy No. 2 in 100 parts by weight with 33 parts by weight of fiberglass filler, to raise the acoustic impedance to 2.5 MRayl, and 3 parts by weight of fumed silica viscosity enhancer. The desired acoustic impedance of 2.5 MRayl was matched to a polystyrene wedge body 20 having approximately the same 2.5 MRayl acoustic impedance. As shown in FIGS. 6 and 7, the frequency response and attenuation provided by the damping wedge 60 material composition are very good. FIG. 6 illustrates the frequency response of an acoustic signal transmitted through a thick (0.48 inch) wedge compared to a thin (0.24 inch) wedge. In FIG. 7, the dashed line is a best fit linear approximation of the actual attenuation values represented by the solid line. The damping wedge 60 made in the ratio 100/33/3 parts by weight exhibited wedge body-damping wedge interface 15 reflection of only about 2%, an attenuation coefficient of about −85.9 (dB/in.)/MHz and attenuation of about −106 dB/in. at 1 MHz, so that noise from longitudinal waves was substantially eliminated. The damping wedge 60 material composition is sufficiently hard that it can be machined to form a desired damping wedge 60 shape.

Example 2

Figure 8:
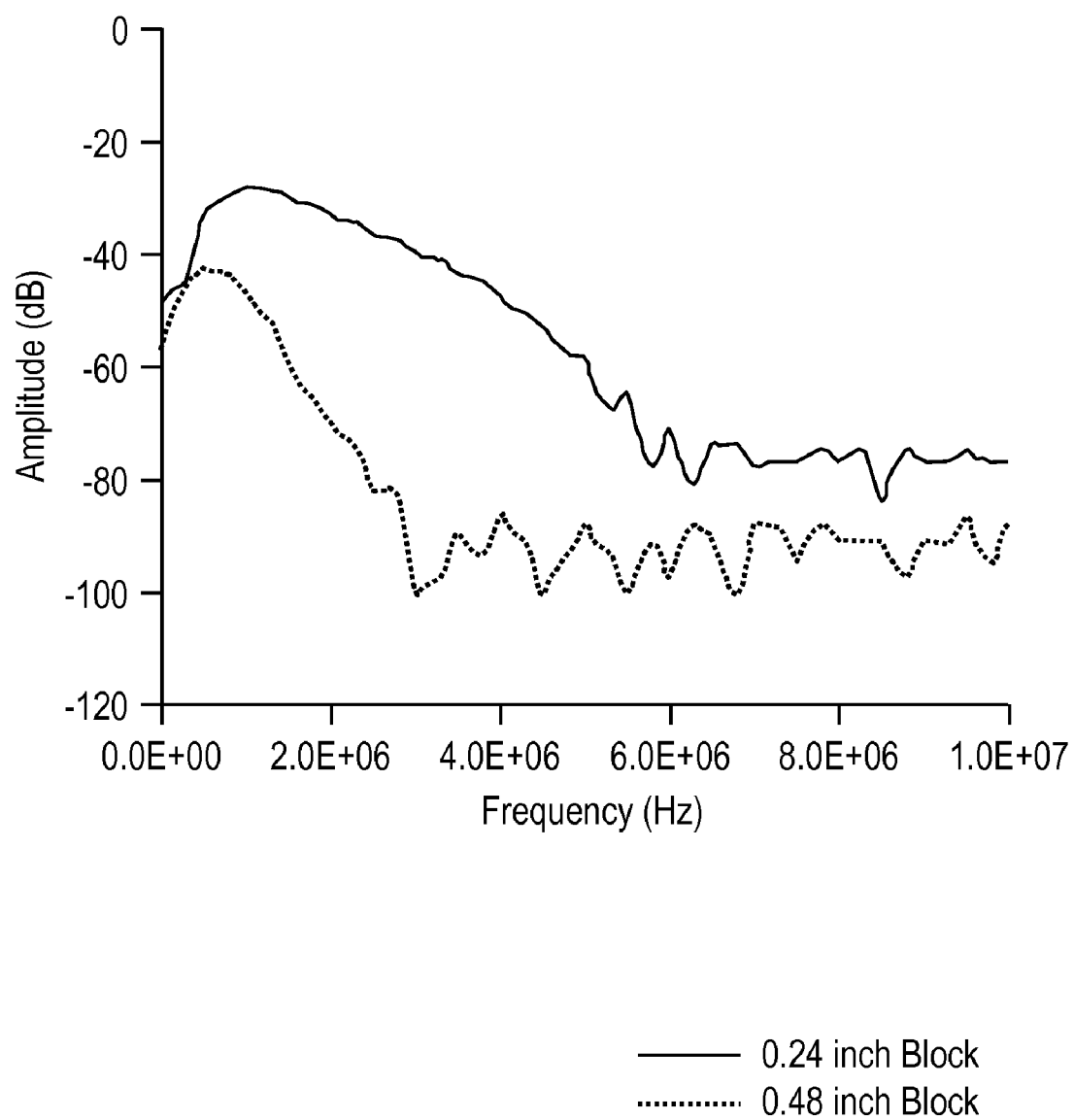
FIG. 8 is a graph showing frequency spectrum response for an acoustic signal transmitted through two different thicknesses of a damping wedge in one embodiment (Example 2) of the invention as a function of frequency versus amplitude.
Figure 9:
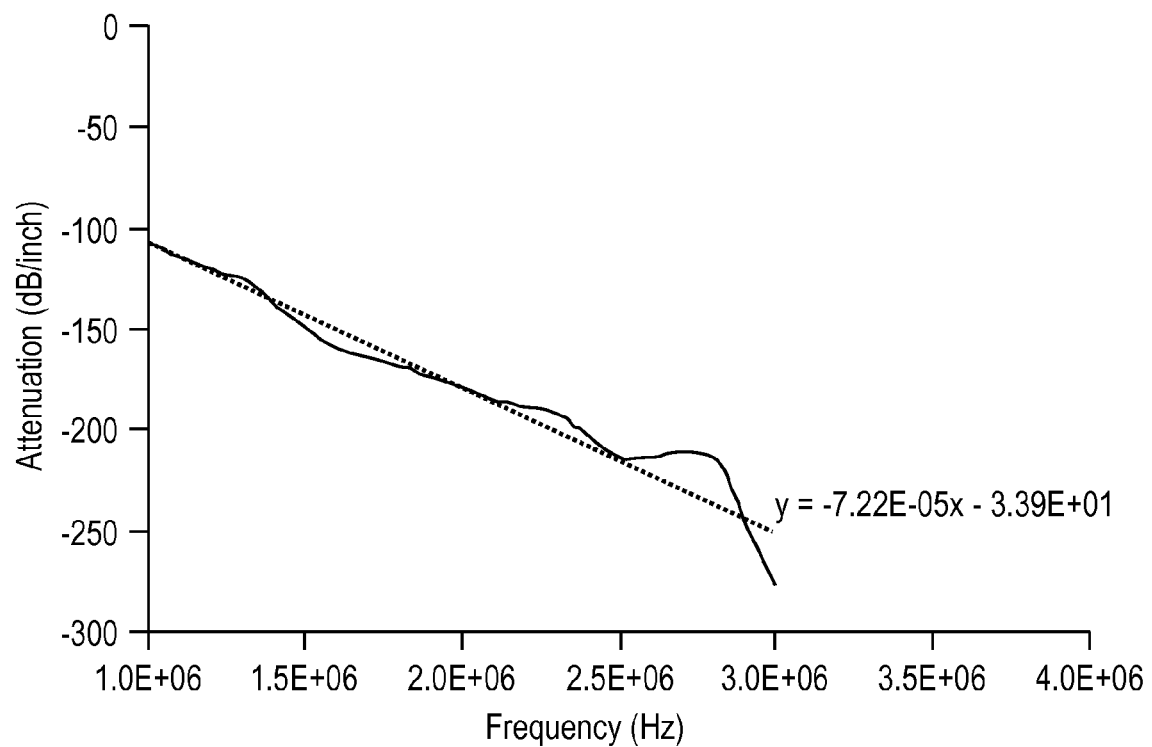
FIG. 9 is a graph showing acoustic signal attenuation in dB per inch as a function of operating frequency in Hertz for the damping wedge of FIG. 8.

A damping wedge 60 material composition was made by combining epoxy No. 2, fiberglass filler, and fumed silica viscosity enhancer in a ratio of 100/20/3. As shown in FIGS. 8 and 9, the frequency response and attenuation provided by the damping wedge 60 material composition are very good. FIG. 8 illustrates the frequency response of an acoustic signal transmitted through a thick (0.48 inch) wedge compared to a thin (0.24 inch) wedge. In FIG. 9, the dashed line is a best fit linear approximation of the actual attenuation values represented by the solid line. The attenuation coefficient of the linear approximation is −72.2 (dB/in.)/MHz, while the attenuation at 2 MHz is approximately −175 dB/in. The impedance matching to a polystyrene wedge body 20 having an acoustic impedance of 2.5 MRayl resulted in reflection of about 6% or less at the wedge body-damping wedge interface 15. The damping wedge 60 material composition is sufficiently hard that it can be machined to form a desired damping wedge 60 shape.

Example 3

Figure 10:
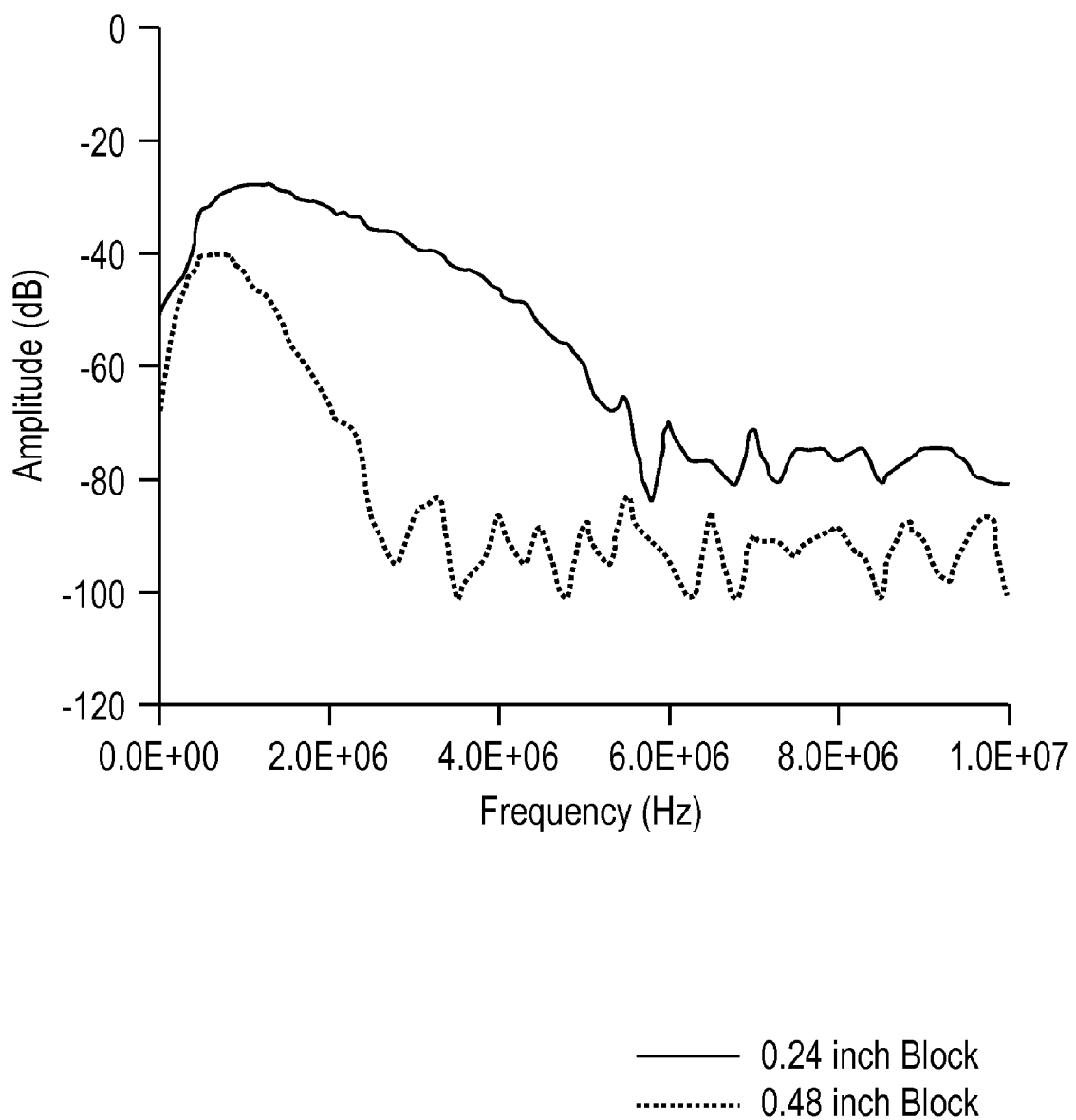
FIG. 10 is a graph showing frequency spectrum response for an acoustic signal transmitted through two different thicknesses of a damping wedge in one embodiment (Example 3) of the invention as a function of frequency versus amplitude.
Figure 11:
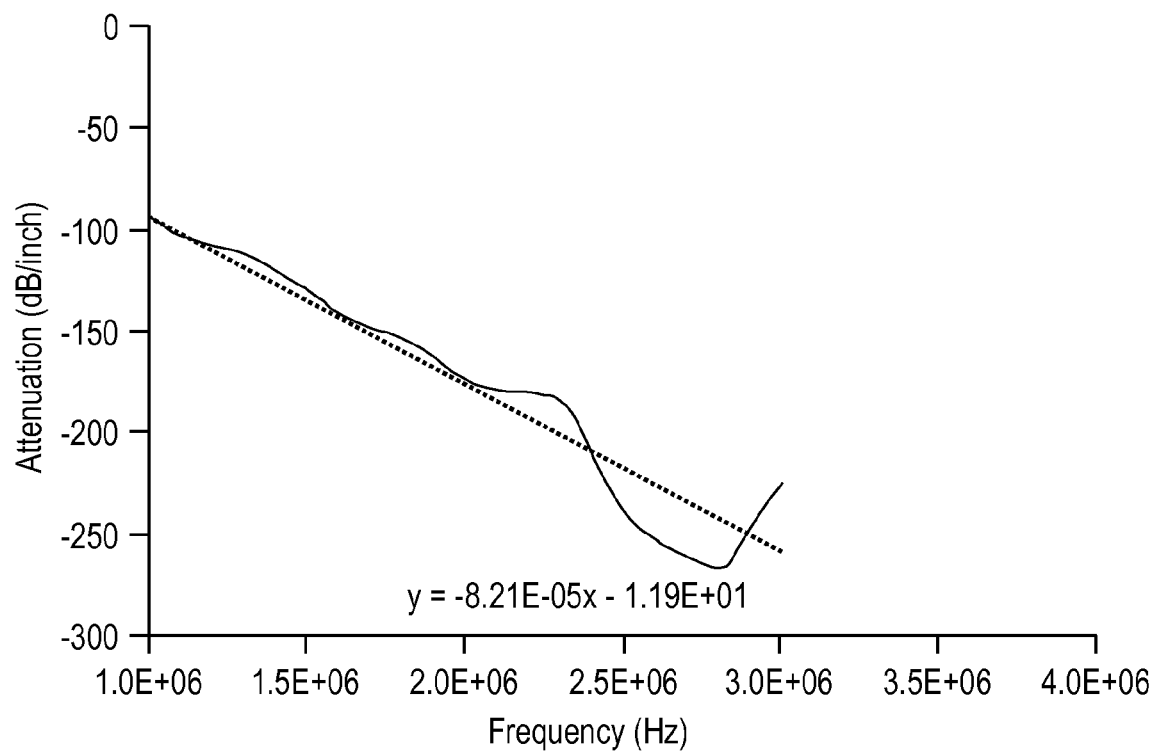
FIG. 11 is a graph showing acoustic signal attenuation in dB per inch as a function of operating frequency in Hertz for the damping wedge of FIG. 10.

A damping wedge 60 material composition was made by combining epoxy No. 2, fiberglass filler, and fumed silica viscosity enhancer in a ratio of 100/30/3. As shown in FIGS. 10 and 11, the frequency response and attenuation provided by the damping wedge 60 material composition are very good. FIG. 10 illustrates the frequency response of an acoustic signal transmitted through a thick (0.48 inch) wedge compared to a thin (0.24 inch) wedge. In FIG. 11, the dashed line is a best fit linear approximation of the actual attenuation values represented by the solid line. The attenuation coefficient of the linear approximation is −82.1 (dB/in.)/MHz, while the attenuation at 2 MHZ is approximately −175 dB/in. The impedance matching to a polystyrene wedge body 20 having an acoustic impedance of 2.5 MRayl resulted in reflection of less than 3% at the wedge body-damping wedge interface 15. The damping wedge 60 material composition is sufficiently hard that it can be machined to form a desired damping wedge 60 shape.

Example 4

Figure 12:
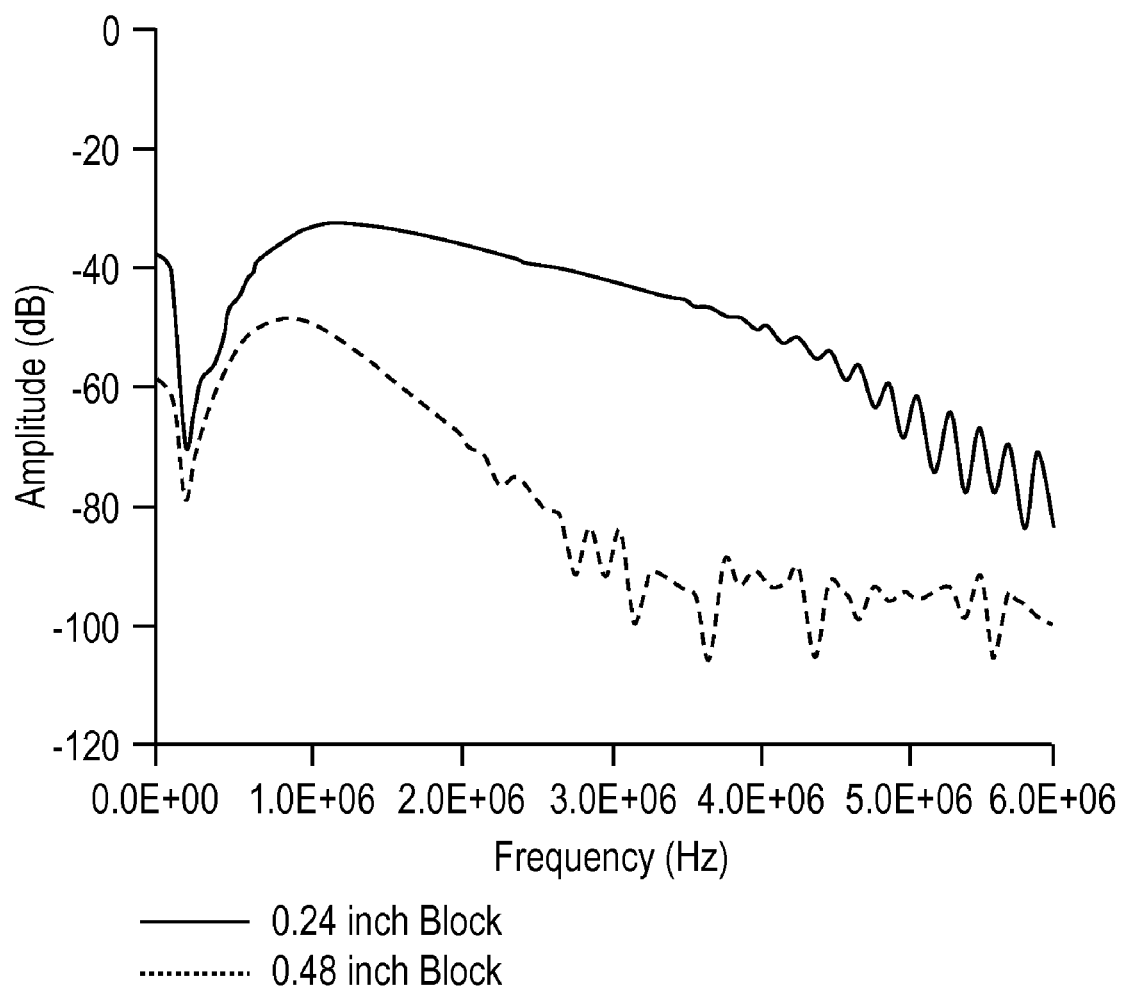
FIG. 12 is a graph showing frequency spectrum response for an acoustic signal transmitted through two different thicknesses of a damping wedge in one embodiment (Example 4) of the invention as a function of frequency versus amplitude.
Figure 13:
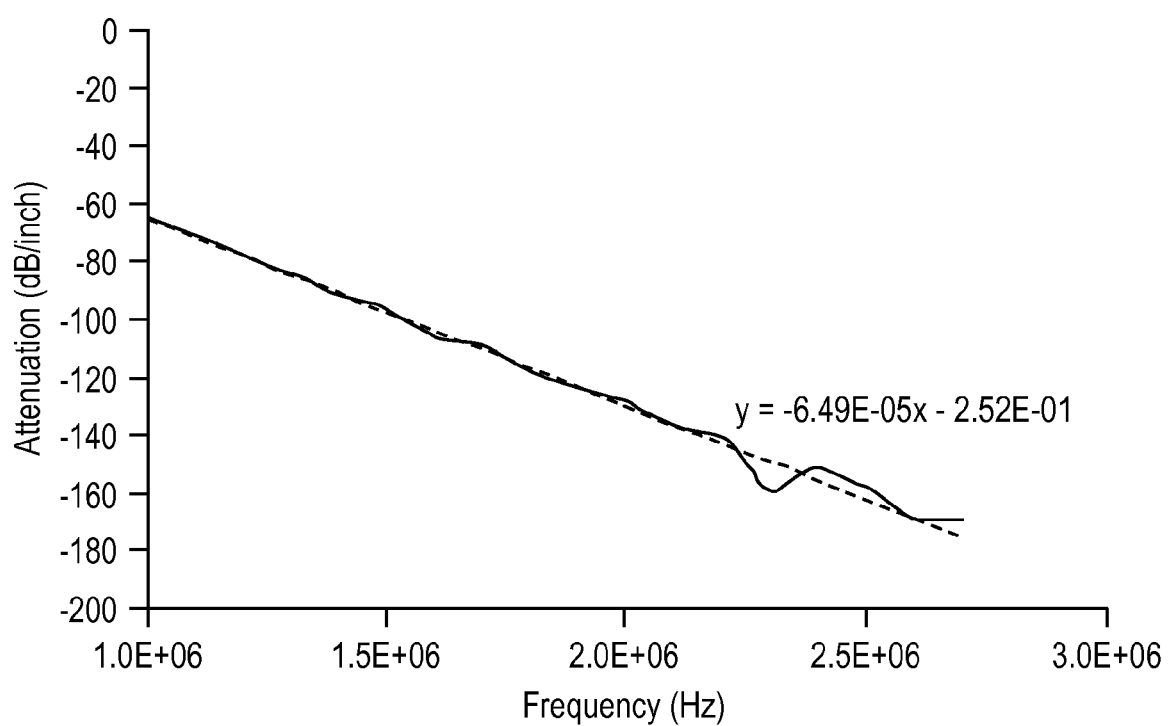
FIG. 13 is a graph showing acoustic signal attenuation in dB per inch as a function of operating frequency in Hertz for the damping wedge of FIG. 12.

A damping wedge 60 material composition was made by combining epoxy No. 2, alumina fiber filler (slightly grounded), and fumed silica viscosity enhancer in a ratio of 100/15/4. As shown in FIGS. 12 and 13, the frequency response and attenuation provided by the damping wedge 60 material composition are very good. FIG. 12 illustrates the frequency response of an acoustic signal transmitted through a thick (0.48 inch) wedge compared to a thin (0.24 inch) wedge. In FIG. 13, the dashed line is a best fit linear approximation of the actual attenuation values represented by the solid line. The attenuation coefficient of the linear approximation is −64.9 (dB/in.)/Mhz, while the attenuation at 2 MHz is approximately −130 dB/in. The impedance matching to a polystyrene wedge body 20 having an acoustic impedance of 2.5 MRayl resulted in reflection of less than 4% at the wedge body-damping wedge interface 15. The damping wedge material is sufficiently hard that it can be machined to form a desired damping wedge 60 shape.

The following Table 2 displays measured material properties, including the attenuation coefficient for several damping wedge 60 material compositions:

TABLE 2

Damping Wedge Material Measured Acoustic Properties

| Material | $c_1$ (km/Sec) | $\alpha_1$ (dB/in.)/MHz) | $\alpha_1/\omega$ (Sec/km) | $c_2$ (km/Sec) | $\alpha_2/\omega$ (Sec/km) | $\rho$ (gm/cm$^3$) |
|---|---|---|---|---|---|---|
| Epoxy No. 1 (Mereco 303) | 2.17 | −17.0 | 0.013 | .99 | 0.0373 | 1.05 |
| Epoxy No. 2 (STYCAST 1265) | 1.86 | −48.6 | 0.0334 | 0.85 | 0.0958 | 1.09 |
| Example 2 Epoxy No. 2/Fiberglass Filler/Fumed Silica Viscosity Enhancer (100/20/3) | 2.00 | −72.2 | 0.0521 | .91 | 0.1495 | 1.23 |
| Example 3 Epoxy No. 2/Fiberglass Filler/Fumed Silica Viscosity Enhancer (100/30/3) | 2.10 | −82.1 | 0.0592 | .96 | 0.170 | 1.29 |
| Example 1 Epoxy No. 2/Fiberglass Filler/Fumed Silica Viscosity Enhancer (100/33/3) | 2.20 | −85.9 | 0.0620 | 1.01 | 0.178 | 1.31 |
| Example 4 Epoxy No. 2/Alumina Fiber Filler/Fumed Silica Viscosity Enhancer (100/15/4) | 1.91 | −64.9 | 0.0468 | 0.88 | 0.134 | 1.23 |

The following Table 3 shows the calculated damping loss factor ratios for the same damping wedge 60 material composition:

TABLE 3

Damping Wedge Material Properties (Complex)

| Material | E* (Pa) | G* (Pa) | Damping loss factor ratio $\eta = \dfrac{E''}{E'}$ |
|---|---|---|---|
| Epoxy No. 1 (Mereco 303) | 2.81E9 + 2.02E8i | 1.02E9 + 7.59E7i | 7.18% |
| Epoxy No. 2 (STYCAST 1265) | 2.37E9 + 4.02E8i | 8.63E8 + 1.50E8i | 16.94% |
| Example 2 Epoxy No. 2/Fiberglass Filler/Fumed Silica Viscosity Enhancer (100/20/3) | 2.60E9 + 6.94E8i | 9.44E8 + 2.59E8i | 26.71% |
| Example 3 Epoxy No. 2/Fiberglass Filler/.Fumed Silica Viscosity Enhancer (100/30/3) | 2.94E9 + 9.44E8i | 1.07E9 + 3.51E8i | 32.1% |
| Example 1 Epoxy No. 2/Fiberglass Filler/Fumed Silica Viscosity Enhancer (100/33/3) | 3.23E9 + 1.14E9i | 1.17E9 + 4.26E8i | 35.41% |
| Example 4 Epoxy No. 2/Alumina Fiber Filler/Fumed Silica Viscosity Enhancer (100/15/4) | 2.42E9 + 5.55E8i | 8.80E8 + 2.07E8i | 22.9% |

As can be seen, the attenuation coefficient, $\alpha_1$, in Table 2 increases for each subsequent material as does the damping loss factor in Table 3.

The damping wedge 60 material compositions according to the embodiments of the invention enable low frequency ultrasonic inspections of relatively small components in confined spaces. The damping wedge 60 material compositions enable substantially noise free ultrasonic probes by virtue of the high attenuation coefficients and impedance matching with the wedge body 20 to substantially eliminate unwanted longitudinal wave reflections from the wedge body-damping wedge interfaces 15. The damping wedge 60 material compositions allow damping wedges 60 of small size to be used to eliminate noise caused by the unconverted longitudinal waves generated by the ultrasonic transducer 30. By reducing the wedge size, wedges with shorter fronts can be positioned much closer, for example, to pipe welds, thereby permitting potential detection of flaws that are not detectable by probes requiring bigger wedges to reduce noise to acceptable levels.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A composition for a damping wedge in an ultrasonic probe having a wedge body, said composition comprising:
   a viscoelastic material having a ratio of the imaginary part to the real part of the modulus of elasticity of at least about 5% and an acoustic impedance less than that of said wedge body;
   a filament-shaped filler in an amount to provide dispersability in said viscoelastic material and to substantially match the acoustic impedance of said damping wedge to said wedge body; and
   a viscosity enhancer in an amount to increase the viscosity of said composition to maintain a homogenous distribution of said filament-shaped filler by preventing said filament-shaped filler from settling.

2. The composition of claim 1, wherein said constituents of said composition are present in the following concentrations:

|  | Weight Percentage |
| --- | --- |
| viscoelastic material | 70 to 95 |
| filament-shaped filler | 3 to 30 |
| viscosity enhancer | 0.5 to 5 |

3. The composition of claim 1, wherein said composition is rigid so as to permit machining to a desired shape.

4. The composition of claim 1, wherein said composition has an attenuation coefficient greater than −17.0 (dB/in.)/MHz.

5. The composition of claim 1, wherein said filament-shaped filler is an inorganic whisker.

6. The composition of claim 1, wherein said filament-shaped filler is fiberglass.

7. The composition of claim 1, wherein said filament-shaped filler is a fiber ceramic.

8. The composition of claim 1, wherein said filament-shaped filler is alumina fiber.

9. The composition of claim 1, wherein said viscoelastic material is an epoxy.

10. The composition of claim 1, wherein said viscoelastic material has an acoustic impedance of between about 1.5 to 3.5 MRayl.

11. The composition of claim 1, wherein said viscosity enhancer is an inorganic filler.

12. The composition of claim 11, wherein said inorganic filler is an amorphous silica.

13. The composition of claim 12, wherein said amorphous silica is an untreated fumed silica.

14. An ultrasonic probe for inspecting a test object for flaws or defects, said ultrasonic probe comprising:
   at least one transducer for injecting longitudinal acoustic waves into said test object;
   a wedge body attached to said at least one transducer configured to transmit said longitudinal acoustic waves from said at least one transducer to said test object;
   a damping wedge attached to said wedge body configured to receive and attenuate any of said longitudinal acoustic waves reflected from the interface of said wedge body and said test object;
   wherein said damping wedge is made from a composition comprising
      a viscoelastic material having a ratio of the imaginary part to the real part of the modulus of elasticity of at least about 5% and an acoustic impedance less than that of said wedge body;
      a filament-shaped filler in an amount to provide dispersability in said viscoelastic material and to substantially match the acoustic impedance of said damping wedge to said wedge body; and
      a viscosity enhancer in an amount to increase the viscosity of said composition to maintain a homogenous distribution of said filament-shaped filler by preventing said filament-shaped filler from settling.

15. The ultrasonic probe of claim 14, wherein said constituents of said composition are present in the following concentrations:

|  | Weight Percentage |
| --- | --- |
| viscoelastic material | 70 to 95 |
| filament-shaped filler | 3 to 30 |
| viscosity enhancer | 0.5 to 5 |

16. The ultrasonic probe of claim 14, wherein said composition is rigid so as to permit machining to a desired shape.

17. The ultrasonic probe of claim 14, wherein said composition, wherein said composition has of an attenuation coefficient greater than −17.0 (dB/in.)/MHz.

18. The ultrasonic probe of claim 14, wherein said filament-shaped filler is an inorganic whisker.

19. The ultrasonic probe of claim 14, wherein said filament-shaped filler is a fiber ceramic.

20. The ultrasonic probe of claim 14, wherein said filament-shaped filler is fiberglass.

21. The ultrasonic probe of claim 14, wherein said filament-shaped filler is alumina fiber.

* * * * *

UNITED STATES PATENT AND TRADEMARK OFFICE
CERTIFICATE OF CORRECTION

| | | |
|---|---|---|
| PATENT NO. | : 8,210,046 B2 | Page 1 of 1 |
| APPLICATION NO. | : 12/187799 | |
| DATED | : July 3, 2012 | |
| INVENTOR(S) | : Luo et al. | |

It is certified that error appears in the above-identified patent and that said Letters Patent is hereby corrected as shown below:

In the Specifications:

In Column 2, Line 26, delete "24 inch and 48 inch" and insert -- .24 inch and .48 inch --, therefor.

In Column 10, in TABLE 3, under "Material", Line 11, delete "Filler/.Fumed" and insert -- Filler/Fumed --, therefor.

In the Claims:

In Column 12, Line 26, in Claim 14, delete "comprising" and insert -- comprising: --, therefor.

In Column 12, Lines 52-53, in Claim 17, delete "wherein said composition, wherein said composition has of an" and insert -- wherein said composition has an --, therefor.

Signed and Sealed this
First Day of January, 2013

David J. Kappos
*Director of the United States Patent and Trademark Office*